(12) United States Patent
Gonzalez et al.

(10) Patent No.: US 9,996,980 B1
(45) Date of Patent: Jun. 12, 2018

(54) AUGMENTED REALITY FOR PROVIDING VEHICLE FUNCTIONALITY THROUGH VIRTUAL FEATURES

(71) Applicant: TOYOTA JIDOSHA KABUSHIKI KAISHA, Toyota-shi, Aichi-ken (JP)

(72) Inventors: Nikos Arechiga Gonzalez, Mountain View, CA (US); Siyuan Dai, Mountain View, CA (US)

(*) Notice: Subject to any disclaimer, the term of this patent is extended or adjusted under 35 U.S.C. 154(b) by 0 days. days.

(21) Appl. No.: 15/356,337

(22) Filed: Nov. 18, 2016

(51) Int. Cl.
| | |
|---|---|
| G06T 15/00 | (2011.01) |
| G06T 19/00 | (2011.01) |
| G06F 3/01 | (2006.01) |
| G06F 3/0481 | (2013.01) |
| G06F 3/16 | (2006.01) |
| G06F 3/0484 | (2013.01) |
| G02B 27/01 | (2006.01) |
| B60W 50/08 | (2012.01) |

(52) U.S. Cl.
CPC ........... G06T 19/006 (2013.01); B60W 50/08 (2013.01); G02B 27/0172 (2013.01); G02B 27/0179 (2013.01); G06F 3/014 (2013.01); G06F 3/016 (2013.01); G06F 3/04815 (2013.01); G06F 3/04845 (2013.01); G06F 3/16 (2013.01); G02B 2027/0138 (2013.01); G02B 2027/0181 (2013.01)

(58) Field of Classification Search
None
See application file for complete search history.

(56) References Cited

U.S. PATENT DOCUMENTS

| | | | | |
|---|---|---|---|---|
| 2014/0148988 A1* | 5/2014 | Lathrop | ............... | B60W 50/10 701/23 |
| 2015/0290531 A1* | 10/2015 | Herz | ......................... | A63F 9/18 434/237 |
| 2015/0339114 A1* | 11/2015 | Rockwell | .................. | G06F 8/65 701/1 |
| 2016/0048725 A1* | 2/2016 | Holz | ....................... | G01P 13/00 345/156 |
| 2016/0363997 A1* | 12/2016 | Black | ...................... | G06F 3/016 |

* cited by examiner

*Primary Examiner* — Frank Chen
(74) *Attorney, Agent, or Firm* — Burbage Law, P.C.; Jon-Michael Burbage; Elizabeth Ruzich

(57) ABSTRACT

The disclosure includes embodiments for providing a virtual feature to a vehicle including an augmented reality ("AR") headset and an AR glove. A method according to some embodiments includes causing the AR headset to display the virtual object which includes a three-dimensional image of a control element operable to control the virtual feature. The method includes monitoring a motion of the AR glove relative to a space in a real-world that appears to the driver to be occupied by the three-dimensional image of the control element when the driver views the space through the AR headset. The method includes providing, using the AR glove, haptic feedback so that the driver feels the control element upon touching the space that appears to include the control element. The method includes providing the virtual feature in accordance with the motion of the AR glove relative to the control element.

20 Claims, 6 Drawing Sheets

AUGMENTED REALITY FOR PROVIDING VEHICLE FUNCTIONALITY THROUGH VIRTUAL FEATURES

BACKGROUND

The specification relates to augmented reality for providing vehicle functionality to a vehicle through virtual features.

Vehicle control systems are becoming increasingly popular. One example of a vehicle control system is an Advanced Driver Assistance System ("ADAS system" if singular, "ADAS systems" if plural).

An ADAS system provides ADAS features to a vehicle. ADAS features include the functionality provided to a vehicle by an ADAS system included in the vehicle. A vehicle may include one or more ADAS system. As such, a single vehicle may have the benefit of one or more ADAS features.

Vehicles also include infotainment systems. An infotainment system provides infotainment features to the vehicle. For example, the infotainment features may include a traditional radio, network-based audio, visual or audio-visual content, etc.

People purchase, lease or rent cars. These cars come equipped with a certain level of functionality based on their "trim level." The trim level of a car identifies the functionality included in the car. For example, one trim level may include anti-lock brakes and a standard radio. Another more expensive trim level may include anti-lock brakes, automatic cruise control ("ACC") and an infotainment system including satellite radio and the ability to stream content via the Internet.

SUMMARY

Described herein is an augmented reality system (herein an "AR system") operable to provide new of different vehicle functionality to a vehicle. Augmented reality may be referred to herein as "AR."

The AR system may be included in a vehicle. The AR system includes an AR headset and one or more AR gloves which are worn by a driver of the vehicle. The AR system communicates with a AR manager via a wireless network to provide new or different vehicle functionality to the vehicle that would not otherwise be available to the driver of this particular vehicle.

For example, the vehicle may be equipped with a trim package that includes basic infotainment features and/or basic ADAS features. The AR system beneficially enables the driver to experience increased infotainment features and/or increased ADAS features. For example, the augmented reality system may effectively increase the trim level of the vehicle by using AR to modify the infotainment features and/or ADAS features of the vehicle.

In some embodiments, the driver may pay a one time or recurring fee for the increased functionality. For example, fee and access to the increased vehicle functionality could be implemented using a Software as a Service (herein "SaaS") business model.

In some embodiments, the AR system is used for marketing or promotional purposes. For example, the AR system could be used by the vehicle manufacturer or automobile dealers to provide the driver with a "sneak peek" at new vehicles or new functionality available in upcoming models.

The AR system described herein may provide numerous benefits to improve the performance of a vehicle. For example, the AR system may provide added vehicle functionality to a vehicle that has less vehicle functionality. For example, the AR system may effectively increase the trim level of the vehicle by providing added virtualized vehicle functionality to the vehicle through AR.

In another example benefit, the AR system may give a driver access to new or different infotainment or ADAS features for a trial period. The AR system may let drivers try out new or different infotainment or ADAS features prior to paying to have hardware installed in their vehicle that would provide these new or different features without the use of AR. In some embodiments, the new or different features may be cosmetic such as leather seats or wood trim.

In another example benefit, the AR system may beneficially provide a driver with a way of doing A/B testing for new or different infotainment or ADAS features. In this way, the driver may monitor how often they use the new or different infotainment or ADAS features and how much they like it relative to the expense of adding these new or different features.

In another example benefit, if a vehicle is shared among multiple drivers, the AR system may have driver profiles so that one driver has access to the new or different infotainment or ADAS features but no other drivers of the same vehicle.

In another example benefit, the AR system may modify the features and appearance of a drivers existing vehicle so that the driver is able to virtually test driver a different vehicle (e.g., the next model year of the same vehicle).

In another example benefit, the AR system may modify the visual appearance of the interior cabin of the vehicle so that the vehicle appears to be neat and clean when viewed through the AR headset when in reality the vehicle is disorderly and dirty.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for providing a virtual feature to a vehicle including an AR headset and an AR glove, where the virtual feature is controllable using a virtual object viewable by a driver using the AR headset and touchable by the driver using the AR glove, the method including: storing image data, glove data and functionality data in a non-transitory memory of the vehicle, where the image data describes a virtual object to be displayed by the AR headset, the glove data describes a type and a degree of haptic feedback to be provided to the driver via the AR glove, and the functionality data includes software operable, when executed by a processor of the vehicle, to enable the processor to provide the virtual feature to the vehicle, where the virtual feature includes one or more of an ADAS functionality or an infotainment functionality; causing the AR headset to display the virtual object which includes a three-dimensional image of a control element for controlling the virtual feature; monitoring a motion of the AR glove to detect the AR glove approaching the three-dimensional image of the control element, where the motion is an indication that the AR glove is going to touch a space in a real-world that appears to the driver to be occupied by the three-dimensional image of the control element when the driver views the space through the AR headset; determining a portion of the glove data that corresponds to the type and the degree of haptic feedback to provide the driver based on the motion of the AR glove; responsive to detecting that that AR glove has touched the space, providing, using the AR glove, the type and the degree of haptic feedback described by the portion of the glove data and providing, by the processor of the vehicle, the virtual feature described by the functionality data. Other embodiments of this aspect include corresponding computer systems, apparatus, and computer programs recorded on one or more computer storage devices, each configured to perform the actions of the methods.

Implementations may include one or more of the following features. The method where the virtual feature includes the ADAS functionality and the virtual feature is provided by an ADAS system of the vehicle responsive to the processor executing the functionality data. The method where the functionality data includes code and routines which, responsive to being executed by the processor, provide a software element which controls operation of one or more hardware elements of the ADAS system, where the software element was not previously included in the ADAS system and the ADAS system is controllable by the driver using the virtual object displayed in the AR headset which includes the three-dimensional image of the control element. The method where the virtual feature includes the infotainment functionality and the image data causes the AR headset to display a three-dimensional image of an infotainment system that is controllable by the driver using the virtual object displayed in the AR headset which includes the three-dimensional image of the control element. The method where the virtual feature includes the infotainment functionality and the image data causes the AR headset to display a three-dimensional image of an infotainment system that is controllable by the driver using the virtual object which includes the three-dimensional image of the control element, where the infotainment system was not included in the vehicle in the real-world. The method where the image data causes the AR headset to display visual infotainment content on a screen of the infotainment system responsive to the driver providing an input to the control element that indicates that the driver wants the screen to display the visual infotainment content. The method where the functionality data causes a speaker of the vehicle to provide audible infotainment content responsive to the driver providing an input to the control element that indicates that the driver wants the speaker to provide the audible infotainment content. The method where the AR headset is a three-dimensional heads-up display unit. The system where the virtual feature includes ADAS functionality and the virtual feature is provided by an ADAS system of the vehicle responsive to the onboard vehicle computer system executing the functionality data. Implementations of the described techniques may include hardware, a method or process, or computer software on a computer-accessible medium.

One general aspect includes a system of a vehicle for providing a virtual feature to the vehicle, the system including: an AR headset; an AR glove; and an onboard vehicle computer system that is communicatively coupled to the AR headset and the AR glove, the onboard vehicle computer system including a non-transitory memory storing computer code which, when executed by the onboard vehicle computer system causes the onboard vehicle computer system to: store image data, glove data and functionality data in a non-transitory memory that is communicatively coupled to the onboard vehicle computer system, where the image data describes a virtual object to be displayed by the AR headset, the glove data describes haptic feedback to be provided to a driver via the AR glove, and the functionality data includes software operable, when executed by the onboard vehicle computer system, to provide the virtual feature to the vehicle; display, using the AR headset, the virtual object which includes a three-dimensional image of a control element for the driver to control the virtual feature; monitor a motion of the AR glove to detect that the AR glove is approaching a space in a real-world that appears to the driver to be occupied by the three-dimensional image of the control element when viewed by the driver through the AR headset; responsive to detecting that that AR glove has touched the space, provide, using the AR glove, the haptic feedback corresponding to the motion of the AR glove; and execute, by the onboard vehicle computer system, the functionality data to cause the onboard vehicle computer system to provide the virtual feature described by the functionality data. Other embodiments of this aspect include corresponding computer systems, apparatus, and computer programs recorded on one or more computer storage devices, each configured to perform the actions of the methods.

Implementations may include one or more of the following features. The system where the virtual feature includes ADAS functionality and the virtual feature is provided by an ADAS system of the vehicle responsive to the onboard vehicle computer system executing the functionality data. The system where the functionality data includes code and routines which, responsive to being executed by the onboard vehicle computer system, provide a software element which controls operation of one or more hardware elements of the ADAS system, where the software element was not previously included in the ADAS system and the ADAS system is controllable by the driver using the virtual object displayed in the AR headset which includes the three-dimensional image of the control element. The system where the virtual feature includes infotainment functionality and the image data causes the AR headset to display a three-dimensional image of an infotainment system that is controllable by the driver using the virtual object displayed in the AR headset which includes the three-dimensional image of the control element. The system where the infotainment system was not included in the vehicle in the real-world. The system where the image data causes the AR headset to display visual infotainment content on a screen of the infotainment system responsive to the driver providing an input to the control element that indicates that the driver wants the screen to display the visual infotainment content. The system where the functionality data causes a speaker of the vehicle to provide audible infotainment content responsive to the driver providing an input to the control element that indicates that the driver wants the speaker to provide the audible infotainment content. The system where the AR headset is a three-dimensional heads-up display unit. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by the onboard vehicle computer system, causes the onboard vehicle computer system to: display, using an AR headset communicatively coupled to the onboard vehicle computer system, a virtual object which includes a three-dimensional image of a control element for a driver to control a virtual feature; monitor a motion of an AR glove communicatively coupled to the onboard vehicle computer system, where the motion of the AR glove is monitored relative to a space that appears to the driver to be occupied by the three-dimensional image of the control element when the space is viewed by the driver through the AR headset; responsive to detecting that a AR glove communicatively coupled to the onboard vehicle computer system has touched the space, provide, using the AR glove, haptic feedback corresponding to the motion of the AR glove relative to the three-dimensional image of the control element and provide the virtual feature in a way that corresponds to the motion of the AR glove relative to the three-dimensional image of the control element. Other embodiments of this aspect include corresponding computer systems, apparatus, and computer programs recorded on one or more computer storage devices, each configured to perform the actions of the methods.

Implementations may include one or more of the following features. The computer program product where the virtual feature includes ADAS functionality and the virtual feature is provided by an ADAS system of the vehicle. The computer program product where the virtual feature includes an infotainment functionality and the AR headset displays a three-dimensional image of an infotainment system that is controllable by the driver using the virtual object displayed in the AR headset which includes the three-dimensional image of the control element. The computer program product where the infotainment system was not included in the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
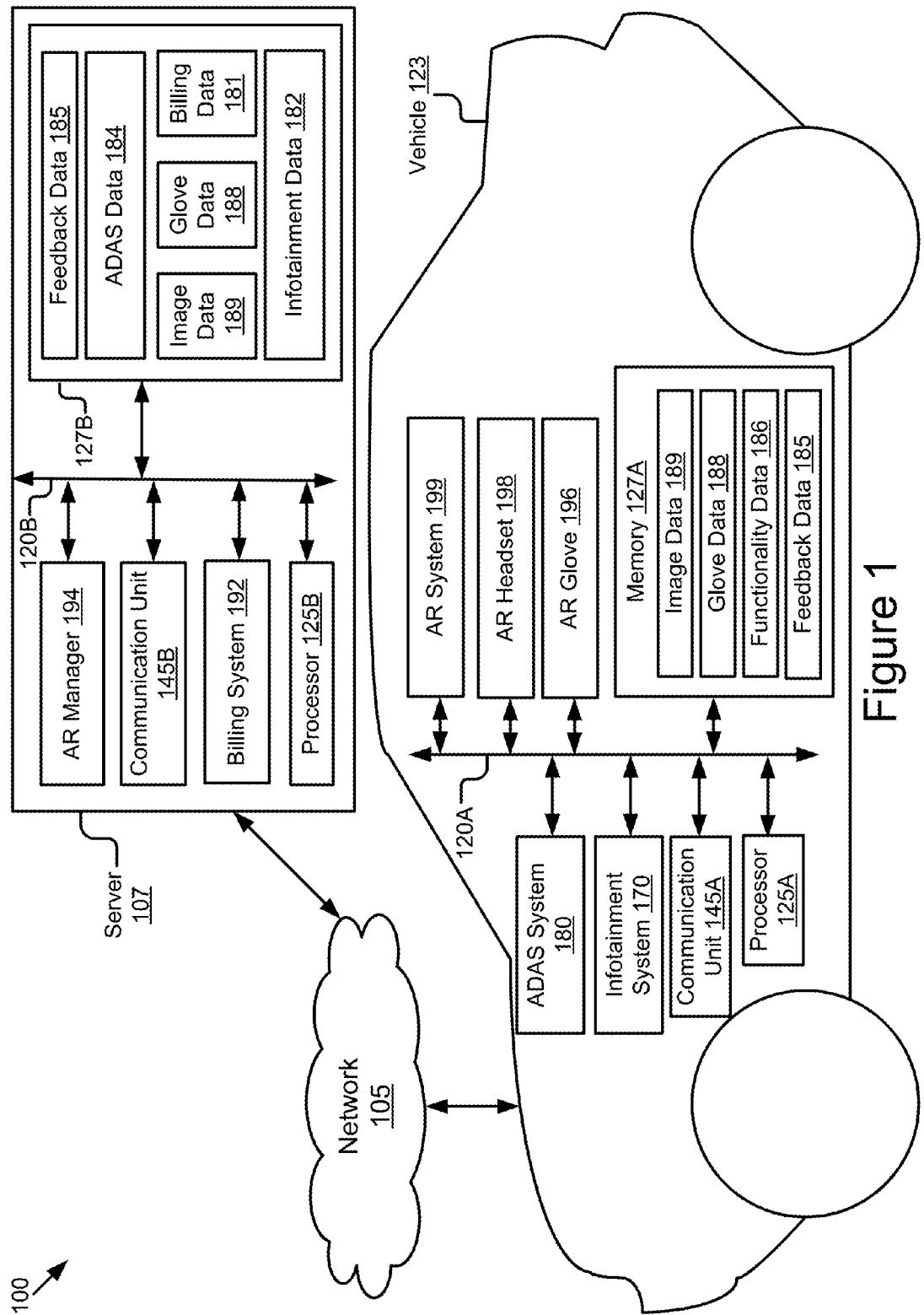
FIG. 1 is a block diagram illustrating an operating environment for a AR system of a vehicle according to some embodiments.

Described herein are embodiments of an AR system included in a vehicle. The AR system is communicatively coupled to a network. The network is also communicatively coupled to a server which includes an AR manager. The AR system and the AR manager wirelessly communicate with one another via the network. In this way, the AR system and the AR manager cooperate to provide new or different vehicle functionality to a vehicle.

Vehicle functionality may include the features that a vehicle is operable to provide to a driver of the vehicle. For example, vehicle functionality may include the ADAS features and the infotainment features that the vehicle is operable to provide to the driver of the vehicle. Vehicle functionality may also include the appearance or tactile qualities of the vehicle when viewed or touched by the driver of the vehicle.

As described above, the AR system and the AR manager cooperate to increase or modify the vehicle functionality of a vehicle that includes the AR system. For example, the vehicle may be equipped with a trim package that includes hardware and/or software that provide basic infotainment features and/or basic ADAS features to the driver of the vehicle. The AR system and the AR manager may enable the vehicle to provide increased infotainment features and/or increased ADAS features to the driver of the vehicle. For example, the AR system and the AR manager may increase the trim level of the vehicle.

In some embodiments, the AR system includes an AR headset and an AR glove.

In some embodiments, the AR headset is configured so that the driver can see the real-world at all times and is not disconnected from the driving experience. The AR headset displays virtual objects that selectively overlay the real-world. See, for example, the virtual object 410 depicted in FIG. 4.

In some embodiments, the graphical overlays may only be present in the AR headset when the driver is looking through the AR headset at objects inside of the vehicle such as the steering wheel, infotainment system control station, etc.

In some embodiments, the virtual objects displayed by the AR headset may be "control inputs" which are not actually present in the vehicle in the real-world but would be needed if the vehicle had come equipped from the factory with the upgraded infotainment system or the upgraded ADAS system whose features and functionality are being provided by the AR system and the AR manager. For example, the virtual objects may graphically depict control inputs such as buttons, knobs, levers, touchpads and other control inputs that would be used by the driver to control the upgraded infotainment system or ADAS system whose features and functionality are being simulated by the AR system.

In some embodiments, the driver is wearing an AR glove. The AR glove is a haptic feedback glove. When the driver reaches out to "touch" the virtual objects displayed by the AR headset (e.g., virtual control inputs), the AR glove provides appropriate haptic feedback to the driver so that the driver feels the virtual object with their hand.

In some embodiments, a virtual object and the AR glove are finely tuned to one another so that: (1) the precision of the control input represented by the virtual object (e.g., how much does a volume knob have to be turned to result in particular level of volume increase) accurately reflects the precision that the driver would expect of the same control input in the real-world; and (2) the virtual object "feels" like what the driver would expect the control input to feel like in the real-world.

For example, if the control input represented by the virtual object appears to have ridges when viewed by the driver through the AR headset, then the AR glove provides the appropriate type and degree of haptic feedback so that the driver can actually feel those ridges when touching the virtual object with the AR glove.

In another example, if the control input represented by the virtual object appears to be made of metal when viewed by the driver through the AR headset, then the AR glove provides the appropriate type and degree of haptic feedback so that the driver thinks they feel metal when touching the virtual object with the AR glove.

As described above, the AR system of the vehicle wirelessly communicates with an AR manager deployed on a server to provide its functionality.

For example, assume a virtual object displayed in the AR headset of the AR system is associated with an infotainment system feature (e.g., the virtual object represents a control input of the infotainment system). When the driver interacts with the virtual object the VR system wirelessly transmits feedback data to the VR manager that describes the action of the driver in relation to the virtual object. The VR manager receives the feedback data from the network. The VR manager analyzes the feedback data to determine how the infotainment system should respond to the action of the driver in relation to the virtual object. The response may include providing a particular infotainment feature to the driver because their action indicates that the driver is attempting to control the infotainment system so that this particular infotainment feature is provided to the driver. The VR manager determines infotainment data that is operable to control the operation of the infotainment system so that the infotainment system provides the particular infotainment feature. The VR manager transmits the infotainment data to the network. The AR system receives the infotainment data from the network. The AR system provides the infotainment data to the infotainment system of the vehicle. The infotainment system receives the infotainment data and provides the particular infotainment feature to the driver. In some embodiments, if the virtual object had been related to a particular ADAS system of the vehicle, then the VR manager would have analyzed the feedback data and provided ADAS data (or a stream of ADAS data) operable to enable the VR manager to control the operation of the ADAS system of the vehicle in real-time (or substantially real-time) based on the ADAS data so that the vehicle and the ADAS system would operate in accordance with their specifications and any standards that are applicable to their operation.

The AR system and the AR manager will now be described in more detail. The following description focuses on using the AR system and the AR manager to add or modify the infotainment or ADAS features already present in a vehicle. However, in practice the AR system and the AR manager can be used to provide other types of vehicle functional to a vehicle such as modifying the appearance of the vehicle when viewed through the AR headset.

Distinguishing Augmented Reality from Virtual Reality

AR and virtual reality ("VR") are not the same thing. In VR, a user is wearing a VR headset which does not allow the use to see the outside world and a pair of headphones that provide audio that correspond to the images displayed by the VR headset while also canceling out the sound of the real-world. In other words, the purpose of VR is to immerse the user in a VR world so that they forget about the real-world entirely.

Accordingly, VR is not suitable for deployment in vehicles since it distracts the driver from the roadway present in the real-world, and so, it is a safety hazard for this reason. The AR system and the AR manager do not provide a VR experience to a driver because doing so would be life-risking safety hazard.

In AR, a user is wearing an AR headset which includes transparent glass (or plastic or some other suitable transparent material) which is configured to allow the user to see the real-world when looking through the AR headset. The AR headset displays virtual objects which include graphical images that overlay the real-world. The virtual objects may visually appear transparent, translucent, opaque or solid. The virtual objects enhance or modify the way the real-world looks when viewed through the AR headset. The user may also be wearing a AR glove which enhances or modifies the way the real-world feels. In other words, the purpose of AR is to add experiences to the real-world without causing the user to forget about the real-world entirely since the real-world is a part of the AR experience.

Described herein are embodiments of a system of a vehicle that provides new or different vehicle functionality to a driver through AR.

Example SaaS Embodiment

The driver may pay a fee for the increased functionality. For example, fee and access to the increased vehicle functionality could be implemented using a Software as a Service (SaaS) business model.

For example, the driver may pay a monthly fee to have a virtualized upgraded trim level. If after time the driver wants to change their vehicle's trim level again, they may do so.

Example Embodiments Including Marketing and Publicity Functionality

In some embodiments, the AR system and the AR manager provide marketing or promotional content to a vehicle. For example, assume that a driver has a model year 2014 Toyota Camry and the model year 2017 Toyota Camry is due to be released soon with new features not present in the 2014 model year. The AR system and the AR manager provide the driver with a "sneak peek" at the model year 2017 Toyota Camry or its new functionality so that the driver may see and feel, using the AR headset and the AR glove, what the interior of the 2017 Toyota Camry looks like or how its features would behave and operate.

In some examples the AR system and the AR manager enable the driver to take a "virtual test drive" of a new model vehicle. If the driver likes the look or features of the new model, the AR headset may display a virtual object that graphically depicts contact information for a local dealer and its inventory available for purchase.

The AR system may also enable a manufacturer to provide notifications to the driver. For example, the manufacturer could use the AR system and the AR manager to provide virtual objects to the driver that inform the driver of special offers or vehicle recalls.

ADAS System

Examples of an ADAS system may include one or more of the following elements of an ego vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a vehicle that makes that ego vehicle be an autonomous vehicle or a semi-autonomous vehicle.

In some embodiments, a model of a vehicle in a model year (such as the vehicle 123 depicted in FIG. 1) is released so that all trim levels of that particular model include the hardware and software (but not the control elements such as knobs, switches, etc.) necessary to provide any ADAS functionality that is available in any other trim level of that vehicle model in that model year. However, individual vehicles of different trim levels include the different control elements that correspond to the ADAS functionality that is advertised for their particular trim level. The software that works with the hardware to provide a particular ADAS feature that is potentially available for this vehicle may be "turned off" so that the vehicle only has access to the ADAS features that correspond to its trim level. In this way, a vehicle may include hidden potential ADAS functionality which is not known or available to the driver of the vehicle. The ADAS data 184 described herein with reference to FIG. 1 may include code and routines that is operable to "turn on" the ADAS software for a vehicle so that this ADAS software and its corresponding ADAS hardware are operable to provide some or all of this hidden ADAS functionality. Moreover, the AR headset may display virtual object that graphically depicts a virtualized version of a control element that the driver of the vehicle can use to engage, disengage or otherwise control the operation of this previously hidden ADAS system.

Example Overview

Referring to FIG. 1, depicted is an operating environment 100 for a AR system 199 of a vehicle 123 according to some embodiments. The operating environment 100 may include one or more of the vehicle 123 and a server 107. These elements may be communicatively coupled to one another via a network 105. Although one vehicle 123, one server 107 and one network 105 are depicted in FIG. 1, in practice the operating environment 100 may include one or more vehicles 123, one or more servers 107 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

In some embodiments, the vehicle 123 is a DSRC-equipped vehicle. The network 105 may include one or more communication channels shared among the vehicle 123 and the server 107. The communication channel may include DSRC, LTE-V2X, full-duplex wireless communication or any other wireless communication protocol. For example, the network 105 may be used to transmit a DSRC message, a DSRC probe, a BSM or a full-duplex message including any of the data described herein.

The vehicle 123 is any type of vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an ADAS system 180. The ADAS system 180 may be operable provide some or all of the functionality that provides autonomous functionality.

In some embodiments, the vehicle 123 includes one or more of the following elements: a processor 125A; a memory 127A; a communication unit 145A; the ADAS system 180; an AR headset 198; one or more AR gloves 196; and an AR system 199. These elements of the vehicle 123 are communicatively coupled to one another via a bus 120A.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server.

In some embodiments, the server 107 includes one or more of the following elements: a processor 125B; a memory 127B; a communication unit 145B; a billing system 192; and an AR manager 194. These elements of the server 107 are communicatively coupled to one another via a bus 120B.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.

Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the AR system 199. The onboard vehicle computer system may be operable to access and execute the data stored on the memory 127 to provide the functionality described herein for the AR system 199 or its elements (see, e.g., FIG. 2). The onboard vehicle computer system may be operable execute the AR system 199 which causes the onboard vehicle computer system to execute one or more of the steps of the method 300 described below with reference to FIGS. 3A and 3B.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 may store one or more of the following elements: image data 189; glove data 188; functionality data 186; and feedback data 185. These elements of the memory 127 are described below with reference to the server 107.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The ADAS system 180 may include one or more advanced driver assistance systems. Examples of an ADAS system 180 may include one or more of the following elements of the vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems 180 provide their own features and functionality that may be referred to herein as a "ADAS feature" or an "ADAS functionality," respectively.

In some embodiments, the ADAS system 180 includes any hardware or software that controls one or more operations of the vehicle 123 so that the vehicle 123 is "autonomous" or "semi-autonomous."

The infotainment system 170 includes any in-car entertainment ("ICE") system or in-vehicle infotainment ("IVI") system.

The AR headset 198 is any conventional AR headset, goggles or glasses. Examples of the AR headset 198 may include one or more of the following: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens. The AR headset 198 is configured so that a driver of the vehicle 123 can be focused on the driving experience when operating the vehicle 123.

Figure 5:
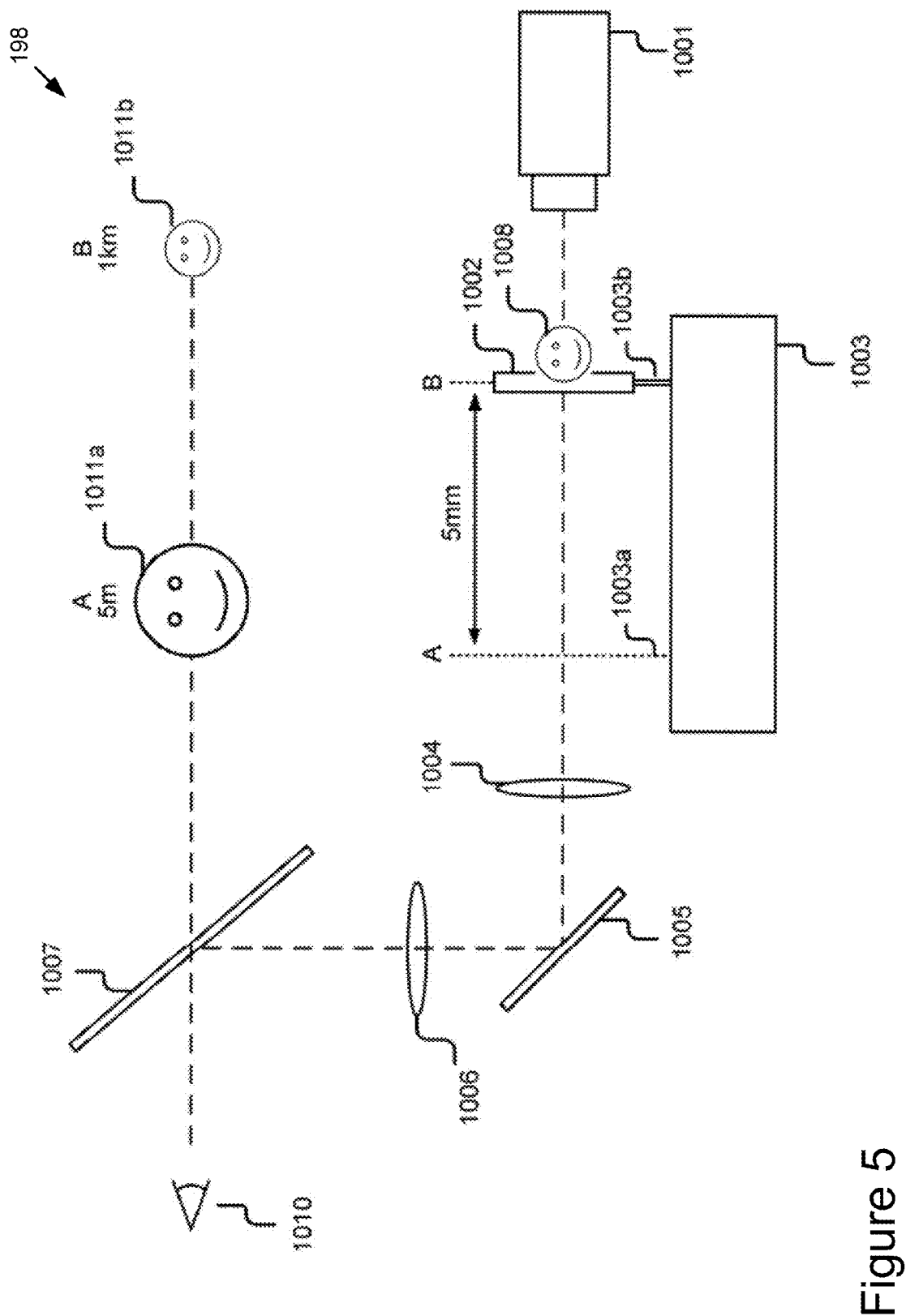
FIG. 5 is a block diagram illustrating an 3D Heads-Up Display Unit (herein "3D HUD") according to some embodiments.

In some embodiments, the AR headset 198 is a 3D HUD. An example of the 3D HUD is depicted in FIG. 5. For example, a driver of the vehicle 123 may view the 3D HUD and the 3D HUD may display virtual objects which the driver may interact with to control the new or different ADAS functionality, or the new or different infotainment functionality, provided to the vehicle 123 by the AR system 199. The 3D HUD is described in more detail below with reference to FIG. 5.

The vehicle 123 may include one or more AR gloves 196. The AR glove 196 is a haptic feedback glove which is configured so that the driver of the vehicle 123 can touch, grasp, and feel virtual objects as if they were real (see, for example, the virtual object 410 depicted in FIG. 4). For example, the virtual object graphically represents a knob and the AR glove 196 is operable to provide haptic feedback to the driver so that virtual object feels firm when touched by the driver's hand that is included in the AR glove 196. If the virtual object is metal, the AR glove 196 is operable to provide haptic and temperature-based feedback so that the virtual object feels cool and hard when touched by the driver's hand that is included in the AR glove 196. If the virtual object represents leather or some other soft, textured object, then the AR glove 196 is operable to provide haptic feedback so that the virtual object feels soft and textured when touched by the driver's hand that is included in the AR glove 196.

In some embodiments, the AR glove 196 includes force-feedback units (herein "motors") to apply torque to the driver's fingers which is included in the AR glove 196. These motors are operable, when controlled by the AR system 199, to dynamically alter the direction and magnitude of the force caused by the driver's hand/finger motion in order to simulate a specific virtual object's stiffness. In this way, the motors of the AR glove 196 provide light resistance when the driver is handling a virtual object that represents a soft object like a leather knob or handle, and heavy resistance when the virtual object is representing a denser object, such as one that would be made of metal in the real-world.

In some embodiments, the AR glove 196 includes other smaller motors that provide haptic vibrations to the driver's fingertips inside the AR glove 196. These haptic vibrations simulate the impact of the driver's finger tapping on a touch interface or running across a textured surface.

In some embodiments, the motors included in the AR glove 196 are sufficiently powerful that they are operable to provide physical feedback that is capable of physically preventing the driver's fingers from penetrating through virtual objects displayed by the AR headset 198.

As described in more detail below, the AR glove 196 may include a non-transitory cache or buffer that temporarily stores data that it receives from the AR system 199.

As described below, the server 107 stores glove data 188. The AR manager 194 provides this glove data 188 to the AR system 199 via the network. The AR system 199 provides this glove data 188 to the AR glove 196. The glove data 188 is operable to control the operation of the AR glove 196. The glove data 188 controls the operation of the motors of the AR glove 196 so that they provide the appropriate type and degree (i.e., amount) of feedback to the driver for different virtual objects and driver motions.

In some embodiments, the AR system 199 may include code or routines that uses the communication unit 145 of the vehicle 123 to communicate with the AR manager 194 via the network 105. The AR manager 194 provides the AR system 199 with data necessary for the AR system 199, the AR headset 198 and the AR glove 196 to provide an AR experience to the driver that includes new or different vehicle functionality relative to the trim level of the vehicle 123.

In some embodiments, the AR system 199 of the vehicle 123 may be implemented using hardware including a field-programmable gate array ("FPGA") or an application-specific integrated circuit ("ASIC"). In some other embodiments, the AR system 199 may be implemented using a combination of hardware and software. The AR system 199 may be stored in a combination of the devices (e.g., servers or other devices), or in one of the devices.

The AR system 199 is described in more detail below with reference to FIGS. 2, 3A, 3B and 4.

Server 107

In some embodiments, the server 107 is a cloud server that includes an AR manager 194 and a billing system 192. The server 107 includes a memory 127. The memory 127 stores any data necessary for the AR system 199, AR headset 198 and the AR glove 196 to provide new or different vehicle functionality to the vehicle 123 that would not otherwise be available to the driver of this particular vehicle 123 because, for example, the trim level of the vehicle 123.

The following elements of the server 107 are the same or similar to those described above for the vehicle 123, and so, the descriptions of these elements will not be repeated here: the processor 125; the memory 127; and the communication unit 145.

The AR Manager 194

The memory 127 of the server 107 stores one or more of the following elements: the image data 189; the glove data 188; billing data 181; ADAS data 184; infotainment data 182; and the feedback data 185.

The image data 189 includes graphical data for causing the AR headset 198 to depict or display virtual objects which may be used, for example, to simulate virtual control elements for new or different infotainment or ADAS functionality.

In some embodiments, the image data 189 also describes, for the AR headset 198, where each virtual control should be displayed or placed inside the cabin of the vehicle 123 when the interior of the cabin is viewed by a driver through the AR headset 198. This placement may be described by three dimensional Cartesian coordinates (X, Y, Z) that are mapped against the interior cabin of the vehicle 123 (see, e.g., an example of an inside cabin of a vehicle 123 in FIG. 4).

In some embodiments, the image data 189 includes digital data that is operable when provided to the AR headset 198 to cause the AR headset 198 to display visual infotainment content on a screen of the infotainment system 170 responsive to the driver providing an input to a control element that indicates that the driver wants the screen to display the visual infotainment content. Visual infotainment content may include, for example, a movie, an image, a television show, a webpage, a GUI for a web application that depicts content configured to be displayed on the screen similar to a mobile web application, or any other content that is viewable by the driver.

In some embodiments, the placement of a virtual control element described by the image data 189 may be configurable by the driver according to the preference of the driver. In this way, the driver can determine for themselves the location of each of the virtual control elements described by the image data 189. For example, the driver may reach out and touch a virtual control element in a certain, predetermined way and then move the virtual control element to a new location. The AR system 199 records feedback data 185 as a Cartesian coordinate describing this new placement of the virtual control element. The AR manager 199 may receive this feedback data 185 and use this feedback data 185 to update the image data 189 for that virtual control element so that the placement information for that virtual control element is updated to reflect the configuration specified by the action of the driver in moving the virtual control element to the new location. In this way, a virtual object that visually represents a virtual control element is configured to be moved by the driver from a first space in the cabin of the vehicle to a second space that is in the cabin of the vehicle (and viewable by the driver using the AR headset) so that a location or placement of the virtual object is configurable by the driver.

The glove data 188 includes digital data that describes, for the motors of the AR glove 196, how the motors should respond to actions of the driver while wearing the AR glove 196. For example, the glove data 188 describes how the motors should respond when the driver touches different virtual objects (e.g., a virtual control element). The glove data 188 may describe a type of feedback that the motors should generate as well as a degree or intensity of this feedback.

The glove data 188 may be configured so that the AR glove 196 provides haptic feedback that matches what the driver would expect to feel if they touched a real-world control element that is similar in texture and material as the three-dimensional image of the control element which is depicted by the virtual object. For example, if the virtual object appears to have ridges, then, if the driver moved their finger across the ridges of the virtual object while wearing the AR glove 196, then the glove data 188 is operable to cause the motors of the AR glove 196 to provide haptic feedback that replicates the way the ridges of the virtual object would feel if touched in the real-world.

In some embodiments, the glove data 188 is associated with the image data 189. For example, the glove data 188 may include multiple instances of digital data that describes the type of feedback that the motors of the AR glove 196 should provide and the degree or intensity of this feedback. Each instance of glove data 188 is associated with a different virtual object described by the image data 189. The association between the glove data 188 and the image data 189 beneficially enables the AR manager 194 to determine which instance of glove data to provide to the AR system 199 for different virtual objects that are about to be touched by the driver of the vehicle 123 while wearing the AR glove 196.

The ADAS data 184 includes digital data that describes different types of upgraded ADAS functionality that may be provided to the vehicle 123 by the AR system 199, the AR headset 198 and the AR glove 196. For example, the ADAS data 184 includes digital data for unlocking hidden ADAS functionality for the vehicle 123.

In some embodiments, the vehicle 123 may include a plurality of different ADAS systems 180, each including a software element and a hardware element. The software element for a particular ADAS system 180 may be disengaged so that the ADAS functionality of this particular ADAS system 180 is locked. The ADAS data 184 may include digital data for unlocking the particular ADAS system 180. In some embodiments, the vehicle 123 may not include the software element for a particular ADAS system 180 and the ADAS data 184 may include the digital data that describes this software element for the particular ADAS system. In this way the ADAS data 184 may include the digital data that is necessary for one or more ADAS systems 180 of a vehicle 123 to provide the different types of ADAS functionality associated with these one or more ADAS systems 180.

In some embodiments, the AR manager 194 controls the operation of the vehicle 123 using the ADAS data 184 to provide the appropriate ADAS functionality to the vehicle 123. ADAS functionality for a particular ADAS system 180 may be appropriate when it conforms to a specification for this particular ADAS system 180 or a governmental or professional standard associated with this particular ADAS system 180.

The infotainment data 182 includes digital data that describes different upgraded infotainment functionality that may be provided to the vehicle 123 by the AR system 199, the AR headset 198 and the AR glove 196. In some embodiments, the infotainment data 182 may include graphical data for causing the AR headset 198 to display a graphic on a display of the infotainment system 170. The graphic may include visual content for the infotainment system 170. For example, the visual content may include a video, an image or some other visual content that may entertain or inform the driver of the vehicle 123. The infotainment data 182 may include audio data that may be played back through one or more speakers of the vehicle 123. The audio data may correspond to the video, images, etc. that are displayed on the display of the infotainment system 170.

In some embodiments, the infotainment data 182 may include graphical data for causing the AR headset 198 to display a virtual version of an infotainment system so that the real-world infotainment system 170 present in the vehicle 123 appears differently when viewed through the AR headset 198. The virtual version of the infotainment system may be a different infotainment system that the real-world infotainment system 170 present in the vehicle 123. This virtual infotainment system may be operable to provide different infotainment functionality to the vehicle 123 relative to the real-world infotainment system 170 present in the vehicle 123. In this way the infotainment data 182 may be operable to cause the AR system 199, the AR headset 198 and the AR glove 196 to upgrade or modify the appearance or functionality of the real-world infotainment system 170 of the vehicle 123.

In some embodiments, the infotainment data 182 may be stored in the memory 127 of the vehicle 123 as functionality data 186. The vehicle 123 may include a speaker or a display panel. For example, the infotainment system 170 of the vehicle 123 may include the speaker or the display panel. One or more of the speaker and the display panel may provide audible or visual infotainment content to the driver of the vehicle 123. Infotainment content may include images which may be displayed on the display panel. Infotainment content may also include sounds which are recreated by the speakers. In some embodiments, the images and the sound may be synchronized. For example, a movie or television show may be infotainment content that includes synchronized sound and images that may be played by via the display panel and the speaker of the infotainment system 170. In some embodiments, the AR headset 198 may include one or more speakers for playing back audible infotainment content.

In some embodiments, the infotainment data 182 includes data necessary for the infotainment system 170, the AR headset 198 or a virtualized version of the infotainment system as provided by the AR system 199 to provide infotainment content to the driver of the vehicle 123.

In some embodiments, the infotainment data 182 may be stored as functionality data 186 that is operable when provided to a speaker of the vehicle (e.g., which may be an element of the AR headset 198 or the infotainment system 170) to cause the speaker to provide audible infotainment content responsive to the driver providing an input to a control element that indicates that the driver wants the speaker to provide the audible infotainment content. The control element may be a virtual object displayed by the AR headset 198.

The billing data 181 includes digital data that describes the cost of the new or different ADAS or infotainment functionality provided to the vehicle 123. The billing data 181 includes digital data for enabling the billing system 192 to communicate with, access and make authorized withdrawals from a monetary account of the driver of the vehicle 123 so that the billing system 192 may initiate and process one or more financial payments for access to the ADAS and infotainment functionality provided by the AR manager 194 and the AR system 199.

The billing system 192 includes software that, when executed by the processor 125 of the server 107, initiates and processes one or more financial payments paid by the driver in exchange for new or different infotainment functionality or ADAS functionality provided by the AR manager 194 and the AR system 199.

The communication unit 145 handles communications between the server 107 and the vehicle 123 via the network 105.

Although not depicted in FIG. 1, in some embodiments the AR manager 194 may include a full-duplex coordination system as described in U.S. patent application Ser. No. 14/471,387 filed on Aug. 28, 2014 and entitled "Full-Duplex Coordination System."

In some embodiments, the driver of the vehicle 123 subscribes to a new virtual feature. For example, the driver may provide one or more inputs to the infotainment system 170 or some other processor-based computing device that is operable to send and receive messages via the network 105 (e.g., a smartphone, laptop, personal computer or some other processor-based computing device). The inputs provided by the driver may specify one or more new virtual features which the driver would like to be available to them through the vehicle 123. The new virtual feature may include new or different ADAS functionality for the vehicle 123 or new or different infotainment functionality for the vehicle 123. These inputs may be referred to herein as "subscription input" if singular or "subscription inputs" if plural.

In some embodiments, a subscription input may specify how to initiate and process authorized payments from a monetary account associated with the driver of the vehicle 123. In some embodiments, this information for initiating and processing authorized payments is provided to the server 107 at the time the vehicle 123 is purchased or leased.

In some embodiments, the subscription input may describe a term or interval selected by the driver. The term or interval may describe how long the new virtual feature should be accessible by the driver using their vehicle 123. For example, the subscription input may specify that the driver would like to have a new or different ADAS functionality available to them in their vehicle 123 for some amount of time such as 7 days, 1 month, 6 months, 1 year, 3 years or any other interval of time.

The communication unit 145 of the server 107 may receive the subscription inputs. The communication unit 145 of the server 107 may provide the subscription inputs to the billing system 192 via the bus 120 of the server 107.

The billing system 192 includes code and routines that are operable, when executed by the processor 125 of the server 107, to analyze the subscription inputs to identify which virtual features are specified by the subscription inputs.

The billing system 192 includes code and routines that are operable, when executed by the processor 125 of the server 107, to retrieve billing data 181 that describes the price of these virtual features. The billing system 192 may also retrieve billing data 181 that describes how to initiate and process authorized payments from the monetary account of the driver of the vehicle 123 (for example, if this information is not included in the subscription input).

The billing system 192 includes code and routines that are operable, when executed by the processor 125 of the server 107, to process one or more payments for the new virtual feature for the term or interval specified by the subscription input. These payments may recur at some regular period or interval that corresponds to the term or interval specified by the subscription input. For example, a new payment may be made every 7 days, 1 month, 6 months, 1 year, 3 years or any other interval of time.

The AR manager 194 includes code and routines that are operable, when executed by the processor 125 of the server 107, to select image data 189 and glove data 188 that corresponds to the new virtual features subscribed to by the driver as specified by the subscription input. The AR manager 194 also includes code and routines that are operable, when executed by the processor 125 of the server 107, to select ADAS data 184 or infotainment data 182 that corresponds with the new virtual features. The AR manager 194 includes code and routines that, when executed by the processor 125 of the server 107, causes the communication unit 145 of the server 107 to transmits the image data 189 and the glove data 188 to the network 105, as well as the ADAS data 184 or infotainment data 182 as appropriate based on the new virtual feature subscribed to by the driver as indicated by the subscription input.

The communication unit 145 of the vehicle 123 receives the image data 189 and the glove data 188, as well as the ADAS data 184 or the infotainment data 182, from the network 105. The communication unit 145 provides this data to the AR system 199 via the bus 120 of the vehicle 123.

The AR system 199 includes code and routines that are operable, when executed by the processor 125 of the vehicle 123, to store the image data 189 and the glove data 188 on the memory 127 of the vehicle 123. The AR system 199 stores the ADAS data 184 or the infotainment data 182 as the functionality data 186 since this data describes the new functionality to be provided by the AR system 199.

The AR system 199 includes code and routines that are operable, when executed by the processor 125 of the vehicle 123, to monitor for a new journey to begin. A journey may include any trip of the vehicle 123 from one geographical location to a different geographical location.

The AR system 199 includes code and routines that are operable, when executed by the processor 125 of the vehicle 123, to detect that a new journey begins based on the occurrence of a key on event or the infotainment system 170 being turned on the driver. In some embodiments, the new journey is determined to begin when the AR system 199 detects, via the bus 120 of the vehicle 123, that the AR headset 198 or AR glove 196 are engaged, powered on or connected to the bus 120 of the vehicle 123 such that are drawing an electrical current.

The AR system 199 includes code and routines that are operable, when executed by the processor 125 of the vehicle 123, to retrieve the image data 189 from the memory 127 and use this image data 189 to cause the AR headset 198 to display one or more virtual objects described by the image data 189.

The AR system 199 includes code and routines that are operable, when executed by the processor 125 of the vehicle 123, to monitor the motion of the AR glove 196. For example, the AR glove 196 may include accelerometers or other sensors that provide feedback to the AR system 199 regarding the motion of the AR glove 196 in relation to one or more virtual objects displayed in the AR headset 198.

The AR system 199 includes code and routines that are operable, when executed by the processor 125 of the vehicle 123, to detect when the AR glove 196 is approaching a particular virtual object displayed by the AR headset 198. For example, the AR system 199 detects when the AR glove 196 is about to touch the particular virtual object displayed by the AR headset 198. The image data 189 for that particular virtual object includes data that specifies a threshold distance between the virtual object and the AR glove 196. At a point where the location of the AR glove 196 meets or crosses the threshold distance specified by the image data 189, the AR system 199 includes code and routines that are operable, when executed by the processor 125 of the vehicle 123, to: (a) retrieve functionality data 186 and glove data 188 that are associated with that particular virtual object; (b) store the retrieved functionality data 186 and glove data 188 in a non-transitory buffer or cache of the AR glove 196 to be available for quick execution by the AR glove 196 or the processor 125 of the vehicle 123; (c) generate feedback data 185 that describes the location of the AR glove 196 and the virtual object implicated by the location of the AR glove 196; and (d) causes the communication unit 145 of the vehicle 123 to transmit the feedback data 185 to network 105. Regarding (c), a virtual object is implicated by the location of the AR glove 196 because, for example, the location threshold of that virtual object has been met or exceeded by the location of the AR glove 196. The location of the AR glove may be described by a Cartesian coordinate or a vector.

The communication unit 145 of the server 107 receives the feedback data 185 from the network 105. The communication unit 145 of the server 107 transmits the feedback data 185 to the AR manager 194 via the communication bus 120 of the server 107.

The AR manager 194 includes code and routines that are operable, when executed by the processor 125 of the server 107, to determine based on the feedback data 185 a type and degree of haptic feedback that is appropriate the AR glove 196 to provide to the driver of the vehicle 123 based on the feedback data 185. The AR manager 194 includes code and routines that are operable, when executed by the processor 125 of the server 107, to determine glove data 188 that describes the type and degree of haptic feedback for the AR glove 196 to provide to the driver of the vehicle 123. The AR manager 194 includes code and routines that are operable, when executed by the processor 125 of the server 107, to cause the communication unit 145 of the server 107 to transmit a reply to the AR system 199 via the network 105 that specifies the type and degree of haptic feedback the AR glove 196 should provide to the driver. The reply may specify a portion of the glove data 188 stored on the memory 127 of the vehicle which the AR system 199 should access and provide to the AR glove 196 to achieve the appropriate type and degree of haptic feedback. For example, the reply includes digital data that identifies a portion of the glove data 188 currently stored in the cache or buffer of the AR glove 196 which should be executed by the AR glove 196 to provide the appropriate type and degree of haptic feedback to the driver via the AR glove 196. The digital data included in the reply that identifies the portion of the glove data 188 which should be executed by the AR glove 196 is referred to herein as a "glove identifier."

The communication unit 145 of the vehicle 123 receives the reply from the network 105. The communication unit 145 of the vehicle 123 transmits the reply to the AR system 199 via the bus 120 of the vehicle.

The AR system 199 includes code and routines that are operable, when executed by the processor 125 of the vehicle 123, to analyze the reply and parse out the glove identifier from the reply.

The AR system 199 includes code and routines that are operable, when executed by the processor 125 of the vehicle 123, to detect when the driver touches the virtual object with the AR glove 196 and cause the communication unit 145 of the vehicle 123 to transmit the glove identifier to the AR glove 196. Responsive to receiving the glove identifier, the AR glove 196 retrieves the glove data 188 identified by the glove identifier from the buffer or cache or the AR glove 196. The processor 125 of the vehicle (or a processor of the AR glove 196) executes the portion of the glove data 188 that corresponds to the glove identifier and, responsive to this execution, one or more motors of the AR glove 196 provide the type and degree of haptic feedback that is described by the portion of the glove data 188 that was executed.

The AR system 199 includes code and routines that are operable, when executed by the processor 125 of the vehicle 123, to cause the infotainment system 170 or ADAS system 180, as applicable, to provide the appropriate function corresponding to the virtual object which was touched by the AR glove 196.

In some embodiments, if the functionality is ADAS related, the AR manager 194 may include code and routines that are operable, when executed by the processor 125 of the server 107, to control the operation of the ADAS system 180 via the network 105 so that the vehicle 123 is controlled appropriately. For example, the AR manager 194 controls the operation of the ADAS system 180 via the network 105 so that the ADAS system 180 operates in conformance with its specification and any standards that are applicable to its operation.

Figure 2:
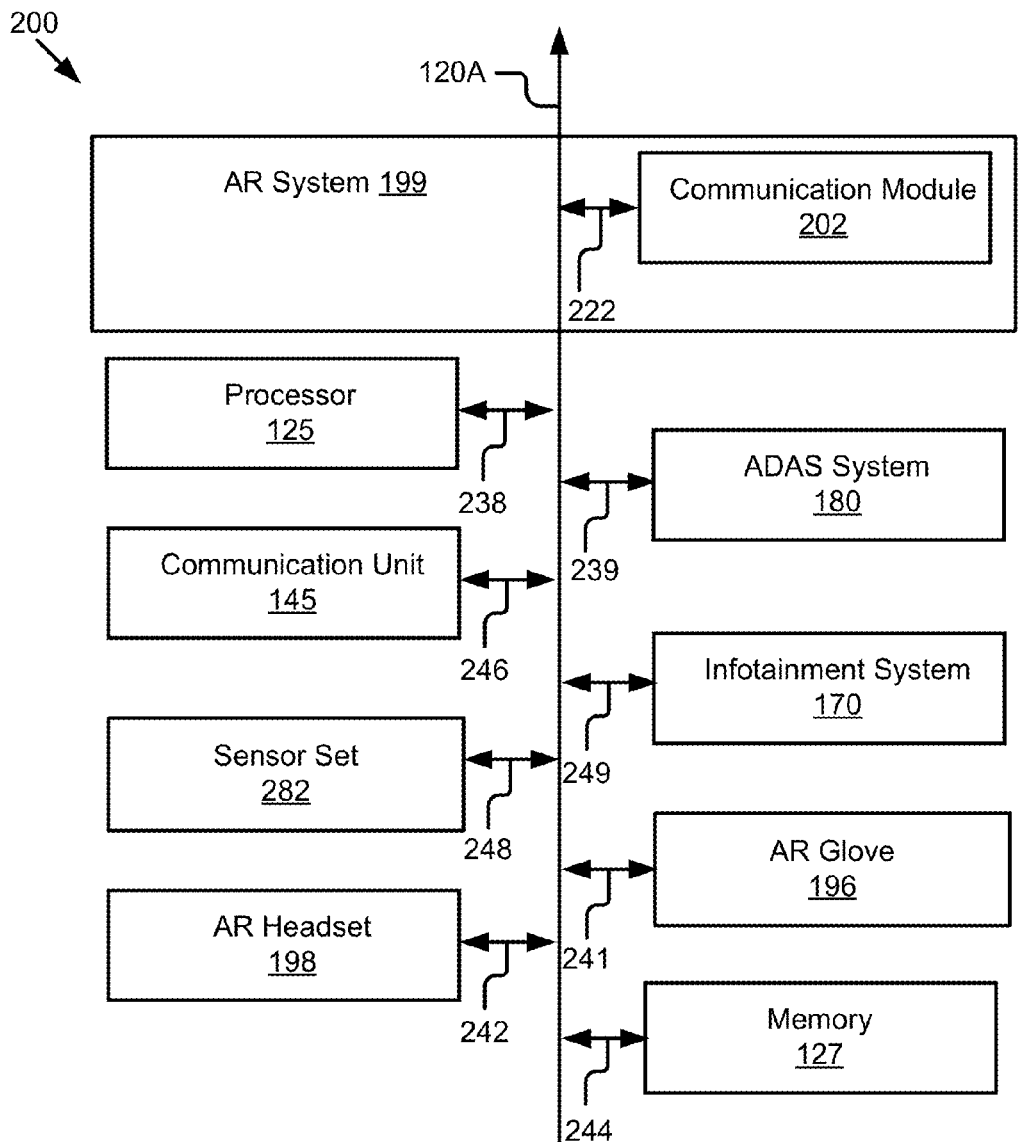
FIG. 2 is a block diagram illustrating an example computer system including the AR system of a vehicle according to some embodiments.

Referring now to FIG. 2, depicted is a block diagram illustrating an example computer system 200 including a AR system 199 according to some embodiments.

In some embodiments, the computer system 200 may include a special-purpose computer system that is programmed to perform one or more steps of a method 300 described below with reference to FIG. 3A or 3B.

In some embodiments, the computer system 200 may be an element the server 107.

In some embodiments, the computer system 200 may be an onboard vehicle computer of the vehicle 123.

In some embodiments, the computer system 200 may include an electronic control unit, head unit or some other processor-based computing device of the vehicle 123.

The computer system 200 may include one or more of the following elements according to some examples: the AR system 199; the processor 125; the communication unit 145; the sensor set 282; the infotainment system 170; the ADAS system 180; the memory 127; the AR glove 196; and the AR headset 198. The components of the computer system 200 are communicatively coupled by a bus 120.

In the illustrated embodiment, the processor 125 is communicatively coupled to the bus 120 via a signal line 238. The communication unit 145 is communicatively coupled to the bus 120 via a signal line 246. The sensor set 282 is communicatively coupled to the bus 120 via a signal line 248. The infotainment system 170 is communicatively coupled to the bus 120 via a signal line 249. The ADAS system 180 is communicatively coupled to the bus 120 via a signal line 239. The AR glove 196 is communicatively coupled to the bus 120 via a signal line 241. The AR headset 198 is communicatively coupled to the bus 120 via a signal line 242. The memory 127 is communicatively coupled to the bus 120 via a signal line 244.

The following elements of the computer system 200 were described above with reference to FIG. 1, and so, those descriptions will not be repeated here: the processor 125; the communication unit 145; the sensor set 282; the infotainment system 170; the ADAS system 180; the AR glove 196; the AR headset 198; and the memory 127.

The memory 127 may store any of the data described above with reference to FIG. 1. The memory 127 may store any data necessary for the computer system 200 to provide its functionality.

The computer system 200 may include a sensor set 282. The sensor set 282 may include one or more sensors that are operable to measure the physical environment outside of the vehicle 123. For example, the sensor set 282 may record one or more physical characteristics of the physical environment that is proximate to the vehicle 123. The sensors of the sensor set 282 may generate sensor data (not pictured). The sensor data may describe the recordings measured by the sensor set 282. The sensor data may be stored on the memory 127. The sensor set 282 may record sensor data that describes information about the vehicle 123 or the operation of one or more of the vehicle 123, the AR glove 196 and the AR headset 198.

In some embodiments, the sensor set 282 may include one or more of the following vehicle sensors: a camera; a LIDAR sensor; a radar sensor; a laser altimeter; a navigation sensor (e.g., a global positioning system sensor which is compliant with the DSRC standard); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

One or more sensors of the sensor set 282 may be operable to record sensor data that describes one or more locations of the vehicle 123 at one or more different times; this data may be timestamped to indicate the time when the vehicle 123 was at this particular location.

One or more sensors of the sensor set 282 may be operable to record data describing a location of the AR glove 196 relative to some other real-world object or a virtual object.

In the illustrated embodiment shown in FIG. 2, the AR system 199 includes a communication module 202. The communication module 202 can be software including routines for handling communications between the AR system 199 and other components of the computer system 200. In some embodiments, the communication module 202 can be a set of instructions executable by the processor 125 to provide the functionality described below for handling communications between the AR system 199 and other components of the computer system 200.

The communication module 202 sends and receives data, via the communication unit 145, to and from one or more elements of the operating environment 100. For example, the communication module 202 receives or transmits, via the communication unit 145, one or more of the following elements: the image data 189; the glove data 188; the ADAS data 184; the infotainment data 182; and the feedback data 185. The communication module 202 may send or receive any of the data or messages described above with reference to FIG. 1 or below with reference to FIGS. 3A and 3B via the communication unit 145.

In some embodiments, the communication module 202 receives data from components of the AR system 199 and stores the data in the memory 127 (or a buffer or cache of the AR glove 196). For example, the communication module 202 receives any of the data described above with reference to the memory 127 from the communication unit 145 (via the network 105) and stores this data in the memory 127 (or a buffer or cache of the AR glove 196).

In some embodiments, the communication module 202 may handle communications between components of the AR system 199.

In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

Figure 3A:
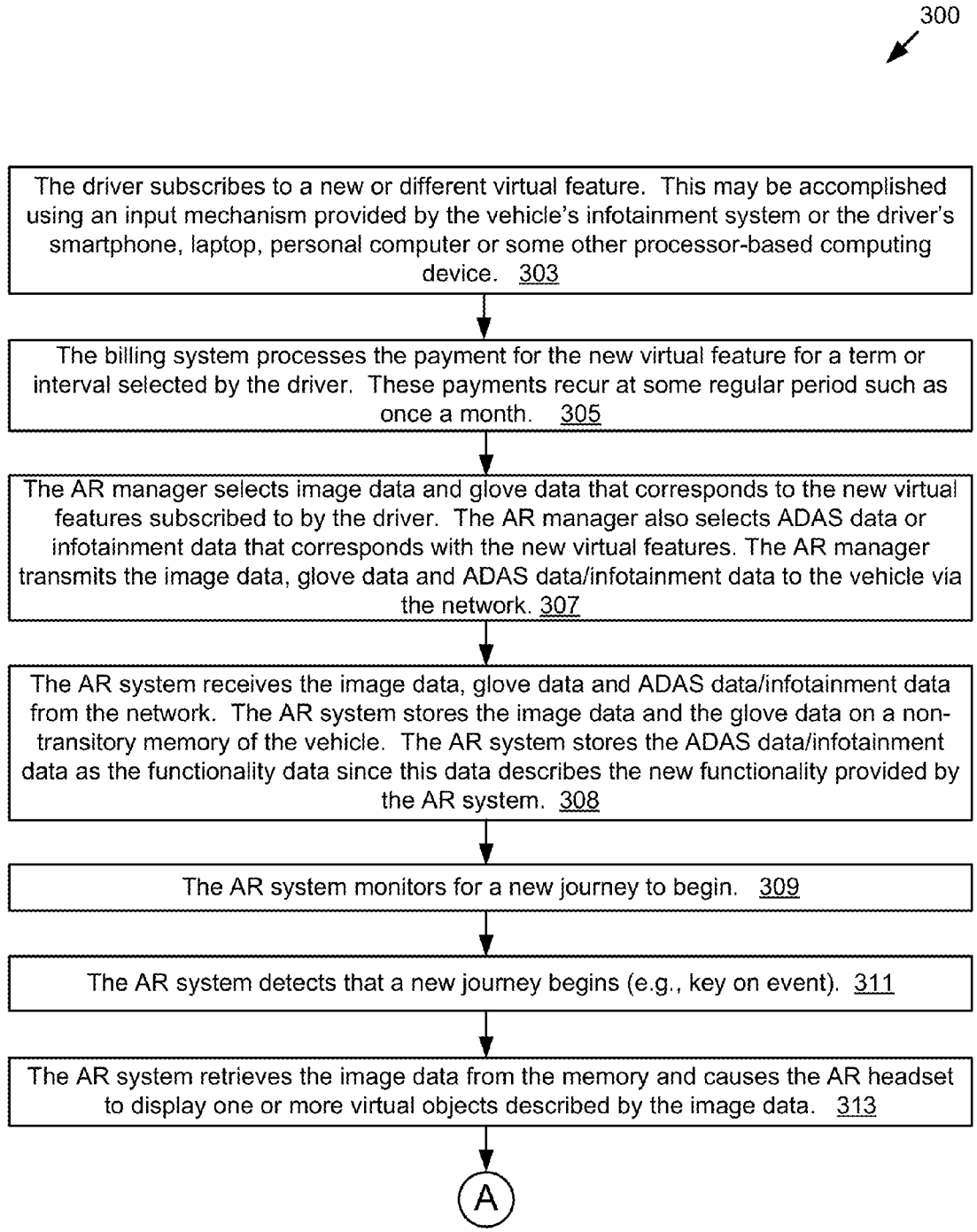
FIGS. 3A and 3B include a flowchart of an example method for providing new or different vehicle functionality to a vehicle using an AR system according to some embodiments.
Figure 3B:
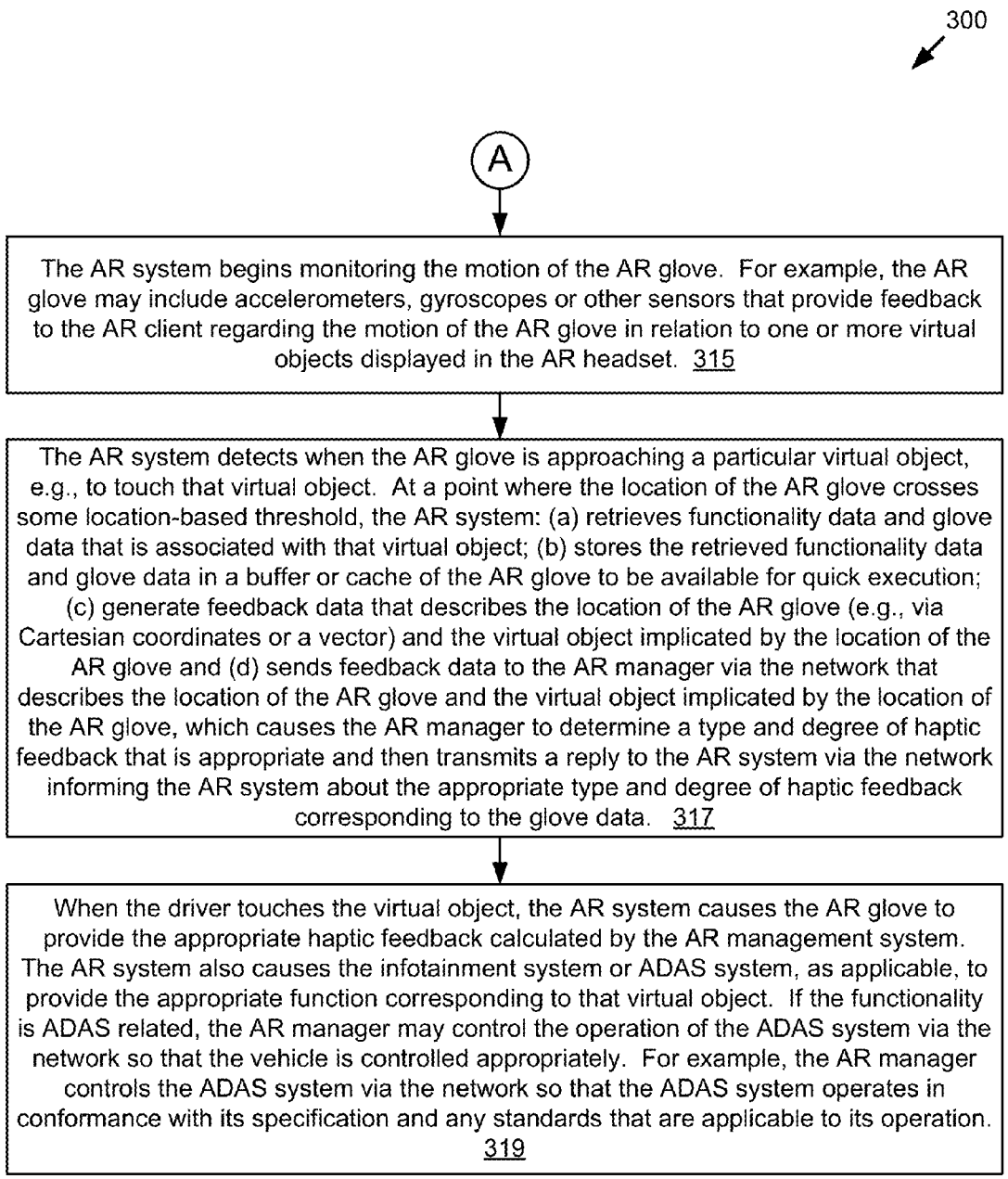

Referring now to FIGS. 3A and 3B, depicted is a flowchart of an example method 300 for providing new or different vehicle functionality to a vehicle using an AR system 199 according to some embodiments. The vehicle functionality may be provided by a virtual feature as described above with reference to FIG. 1.

One or more of the steps described herein for the method 300 may be executed by one or more computer systems 200.

Referring now to FIG. 3A. At step 303, the driver subscribes to a new or different virtual feature. This may be accomplished using an input mechanism provided by the vehicle's infotainment system or the driver's smartphone, laptop, personal computer or some other processor-based computing device.

At step 305, the billing system processes the payment for the new or different virtual feature for a term or interval selected by the driver. In some embodiments, these payments recur at some regular period such as once a month or some other interval.

At step 307, the AR manager selects image data and glove data that corresponds to the new or different virtual features subscribed to by the driver. The AR manager also selects ADAS data or infotainment data that corresponds with the new or different virtual features. The AR manager transmits the image data and the glove data, as well as the ADAS data or infotainment data as applicable, to the vehicle via the network.

At step 308, the AR system receives the image data and the glove data, as well as the ADAS data or the infotainment data as applicable, from the network. The AR system stores the image data and the glove data on a non-transitory memory of the vehicle. The AR system stores the ADAS data or the infotainment data as the functionality data since this data describes the new functionality provided by the AR system.

At step 309, the AR system monitors for a new journey to begin.

At step 311, the AR system detects that a new journey is beginning (e.g., a key on event).

At step 313, the AR system retrieves the image data from the memory and causes the AR headset to display one or more virtual objects described by the image data.

Referring now to FIG. 3B. At step 315, the AR system begins monitoring the motion of the AR glove. For example, the AR glove may include accelerometers or other sensors that provide feedback to the AR client regarding the motion of the AR glove in relation to one or more virtual objects displayed in the AR headset.

At step 317, the AR system detects when the AR glove is approaching a particular virtual object, e.g., to touch that virtual object. At a point where the location of the AR glove crosses some location-based threshold, the AR system: (a) retrieves functionality data and glove data that is associated with that virtual object; (b) stores the retrieved functionality data and glove data in a buffer or cache of the AR glove to be available for quick execution; (c) generate feedback data that describes the location of the AR glove (e.g., via Cartesian coordinates or a vector) and the virtual object implicated by the location of the AR glove and (d) sends feedback data to the AR manager via the network that describes the location of the AR glove and the virtual object implicated by the location of the AR glove, which causes the AR manager to determine a type and degree of haptic feedback that is appropriate and then transmits a reply to the AR system via the network informing the AR system about the appropriate type and degree of haptic feedback corresponding to the glove data.

At step 319, when the driver touches the virtual object (or a point in three-dimensional space of the real-world which, according to the vision of the driver when looking through the AR headset includes the virtual object), the AR system causes the AR glove to provide the appropriate haptic feedback calculated by the AR management system. The AR system also causes the infotainment system or ADAS system, as applicable, to provide the appropriate virtual feature corresponding to that virtual object.

In some embodiments, if the virtual feature is related to the ADAS system, the real-world ADAS system may provide the virtual feature using the functionality data which may include the software component for the ADAS system which controls the operation of one or more hardware components for the ADAS system. In this way, the functionality data, as well as the control element provided by the image data, may enable the vehicle to provide hidden ADAS functionality.

In some embodiments, if the virtual feature is related to the ADAS system, the AR manager may control the operation of the ADAS system via the network so that the vehicle is controlled appropriately. For example, the AR manager controls the ADAS system via the network so that the ADAS system operates in conformance with its specification and any standards that are applicable to its operation.

Figure 4:
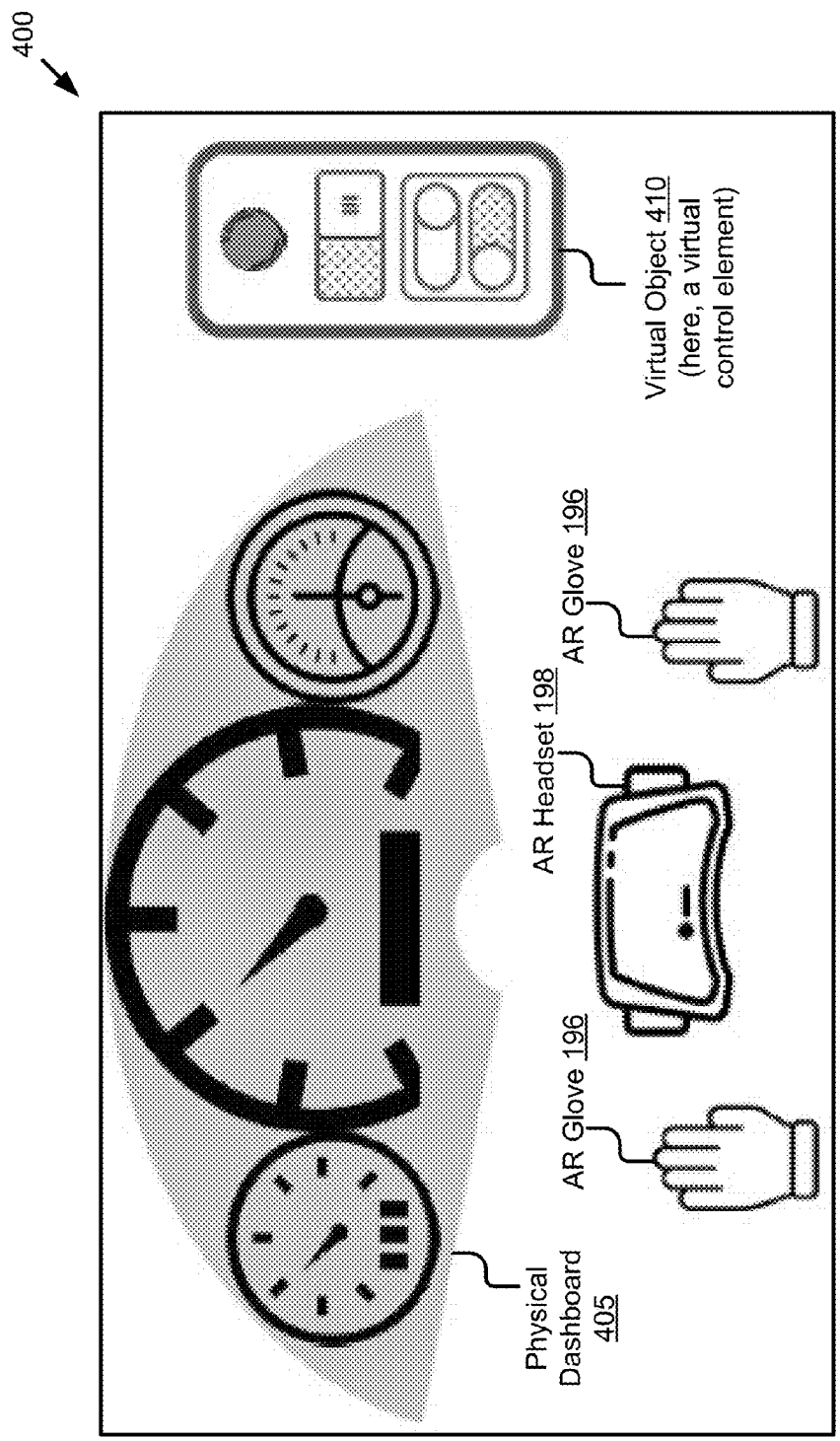
FIG. 4 is a block diagram illustrating an example of a virtual object viewable by a driver when looking through an AR headset of the AR system according to some embodiments.

Referring now to FIG. 4, depicted is a block diagram illustrating an example of a virtual object 410 viewable by a driver when looking through an AR headset 198 of the AR system according to some embodiments. The virtual object 410 is located at a point in three-dimensional space of the real-world which, according to the vision of the driver when looking through the AR headset 198 includes the virtual object 410.

FIG. 4 includes an illustration 400 of the interior of a vehicle. The vehicle includes a physical dashboard 405. The physical dashboard 405 does not include a physical control element in the real-world that is operable to control an ADAS functionality or the infotainment functionality which is controllable by the driver of the vehicle using the virtual object 410.

In some embodiments, the virtual object 410 a three-dimensional image of a control element which is operable to control the operation of a virtual feature (e.g., (1) a new or different ADAS functionality or (2) a new or different infotainment functionality).

Referring to FIG. 5, depicted is a block diagram illustrating a AR headset 198 in embodiments where the AR headset 198 is a 3D HUD.

In some embodiments, the 3D HUD includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The image 1008 may include a virtual object. For example, the image 1008 may be the virtual object 410 described above with reference to FIG. 4.

The movable screen 1002 includes a transparent plate and so the light of the projected image transmits through the movable screen 1002 to be projected on the windshield 1007 of a vehicle (e.g., the vehicle 123). The image projected on the windshield 1007 is perceived by a driver 1010 as if it is a real object (shown as 1011a, 1011b) that exists in the three-dimensional space of the real-world, as opposed to an object that is projected on the windshield.

In some embodiments, the 3D HUD is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real-world. In one example, the movable range of the screen 1002 (distance between positions 1003a and 1003b) may be 5 mm, which correspond to from 5 m away to infinity in the real-world. The use of the 3D HUD allows the driver 1010 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD depicted in FIG. 5 is provided by way of example. Other examples are possible. These examples may include heads-up displays having more or less complexity than the 3D HUD depicted in FIG. 5. For example, it is anticipated that in the future there will be heads-up displays that do not require movable parts such as the movable screen 1002. For example, a static screen that does not move may be deployed. The heads-up display deployed may not be a two-dimensional heads-up display unit. In some embodiments, the AR system 199 and the image data 189 described above with reference to FIGS. 1, 2, 3A and 3B is designed to be operable with such components.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for providing an option to unlock a new virtual feature for a vehicle including an augmented reality ("AR") headset and an AR glove, wherein the virtual feature is controllable using a virtual object viewable by a driver using the AR headset and touchable by the driver using the AR glove, the method comprising:
storing image data, glove data and functionality data in a non-transitory memory of the vehicle, wherein the image data describes a virtual object to be displayed by the AR headset and the functionality data includes software operable, when executed by a processor of the vehicle, to enable the processor to provide (1) an initial virtual feature to the vehicle, wherein the initial virtual feature includes an initial advanced driver assistance system functionality ("ADAS functionality") and (2) a new virtual feature after it is unlocked, wherein the new virtual feature includes a new ADAS functionality;
causing the AR headset to display the virtual object which includes a three-dimensional image of a control element for controlling the virtual feature;
monitoring a motion of the AR glove to detect the AR glove approaching the three-dimensional image of the control element, wherein the motion is an indication that the AR glove is going to touch a space in a real-world that appears to the driver to be occupied by the three-dimensional image of the control element when the driver views the space through the AR headset;

providing, by the processor of the vehicle, the virtual feature described by the functionality data based on the motion of the AR glove; and providing an option to unlock the new virtual feature to access the new ADAS functionality, wherein the new ADAS functionality was not previously available and the new ADAS functionality corresponds to a newer vehicle such that unlocking the new virtual feature results in the driver virtually test driving a different vehicle with a new interior cabin appearance of the newer vehicle superimposed and opaque on an entire physical cabin of the vehicle.

2. The method of claim 1, wherein the initial virtual feature is provided by an advanced driver assistance system ("ADAS system") of the vehicle responsive to the processor executing the functionality data.

3. The method of claim 2, wherein the new ADAS functionality for the new virtual feature is part of a subscription and further comprising:
processing an authorized payment from a monetary account associated with the driver of the vehicle for the new virtual feature based on the subscription.

4. The method of claim 1, further comprising:
determining that the driver used the virtual object to unlock the new virtual feature to access the new ADAS functionality, wherein the new ADAS functionality corresponds to a different trim level than a current trim level for the vehicle.

5. The method of claim 1, wherein the initial virtual feature further includes an infotainment functionality and the image data causes the AR headset to display a three-dimensional image of an infotainment system that is controllable by the driver using the virtual object which includes the three-dimensional image of the control element, wherein the infotainment system was not included in the vehicle in the real-world.

6. The method of claim 5, wherein the image data causes the AR headset to display visual infotainment content on a screen of the infotainment system responsive to the driver providing an input to the control element that indicates that the driver wants the screen to display the visual infotainment content.

7. The method of claim 5, wherein the functionality data causes a speaker of the vehicle to provide audible infotainment content responsive to the driver providing an input to the control element that indicates that the driver wants the speaker to provide the audible infotainment content.

8. The method of claim 1, wherein the virtual object is configured to be moved by the driver to a second space that is within a cabin of the vehicle and viewable by the driver using the AR headset so that a placement of the virtual object is configurable by the driver.

9. A system of a vehicle for providing an option to unlock a new virtual feature for the vehicle, the system comprising:
an augmented reality ("AR") headset;
an AR glove; and
an onboard vehicle computer system that is communicatively coupled to the AR headset and the AR glove, the onboard vehicle computer system including a non-transitory memory storing computer code which, when executed by the onboard vehicle computer system causes the onboard vehicle computer system to:
store image data, glove data and functionality data in a non-transitory memory that is communicatively coupled to the onboard vehicle computer system, wherein the image data describes a virtual object to be displayed by the AR headset and the functionality data includes software operable, when executed by the onboard vehicle computer system, to provide (1) an initial virtual feature to the vehicle, wherein the initial virtual feature includes an initial advanced driver assistance functionality ("ADAS functionality") and (2) a new virtual feature after it is unlocked, wherein the new virtual feature includes a new ADAS functionality;
display, using the AR headset, the virtual object which includes a three-dimensional image of a control element for a driver to control the virtual feature;
monitor a motion of the AR glove to detect that the AR glove is approaching a space in a real-world that appears to the driver to be occupied by the three-dimensional image of the control element when viewed by the driver through the AR headset;
responsive to detecting that that the AR glove has touched the space, execute, by the onboard vehicle computer system, the functionality data to cause the onboard vehicle computer system to provide the virtual feature described by the functionality data; and
provide an option to unlock the new virtual feature to access the new ADAS functionality, wherein the new ADAS functionality was not previously available and the new ADAS functionality corresponds to a newer vehicle such that unlocking the new virtual feature results in the driver virtually test driving a different vehicle with a new interior cabin appearance of the newer vehicle superimposed and opaque on an entire physical cabin of the vehicle.

10. The system of claim 9, wherein the initial virtual feature is provided by an advanced driver assistance system ("ADAS system") of the vehicle responsive to the onboard vehicle computer system executing the functionality data.

11. The system of claim 10, wherein the new ADAS functionality for the new virtual feature is part of a subscription and further comprising:
processing an authorized payment from a monetary account associated with the driver of the vehicle for the new virtual feature based on the subscription.

12. The system of claim 9, wherein the virtual feature includes infotainment functionality and the image data causes the AR headset to display a three-dimensional image of an infotainment system that is controllable by the driver using the virtual object displayed in the AR headset which includes the three-dimensional image of the control element.

13. The system of claim 12, wherein the infotainment system was not included in the vehicle in the real-world.

14. The system of claim 13, wherein the image data causes the AR headset to display visual infotainment content on a screen of the infotainment system responsive to the driver providing an input to the control element that indicates that the driver wants the screen to display the visual infotainment content.

15. The system of claim 13, wherein the functionality data causes a speaker of the vehicle to provide audible infotainment content responsive to the driver providing an input to the control element that indicates that the driver wants the speaker to provide the audible infotainment content.

16. The system of claim 9, wherein the AR headset is a three-dimensional heads-up display unit.

17. A computer program product comprising a non-transitory memory of an onboard vehicle computer system of a vehicle storing computer-executable code that, when executed by the onboard vehicle computer system, causes the onboard vehicle computer system to:
store functionality data in a non-transitory memory that is communicatively coupled to the onboard vehicle computer system, wherein the functionality data includes software operable, when executed by the onboard vehicle computer system to provide (1) an initial virtual feature to the vehicle, wherein the initial virtual feature includes an initial advanced driver assistance functionality ("ADAS functionality") and (2) a new virtual feature after it is unlocked, wherein the new virtual feature includes a new ADAS functionality;

display, using an AR headset communicatively coupled to the onboard vehicle computer system, a virtual object which includes a three-dimensional image of a control element for a driver to control a virtual feature;

monitor a motion of an AR glove communicatively coupled to the onboard vehicle computer system, wherein the motion of the AR glove is monitored relative to a space that appears to the driver to be occupied by the three-dimensional image of the control element when the space is viewed by the driver through the AR headset;

responsive to detecting that the AR glove communicatively coupled to the onboard vehicle computer system has touched the space, provide the virtual feature in a way that corresponds to the motion of the AR glove relative to the three-dimensional image of the control element; and provide an option to unlock the new virtual feature to access the new ADAS functionality, wherein the new ADAS functionality was not previously available and the new ADAS functionality corresponds to a newer vehicle such that unlocking the new virtual feature results in the driver virtually test driving a different vehicle with a new interior cabin appearance of the newer vehicle superimposed and opaque on an entire physical cabin of the vehicle.

18. The computer program product of claim 17, wherein the initial virtual feature is provided by an advanced driver assistance system ("ADAS system") of the vehicle.

19. The computer program product of claim 17, wherein the initial virtual feature includes an infotainment functionality and the AR headset displays a three-dimensional image of an infotainment system that is controllable by the driver using the virtual object displayed in the AR headset which includes the three-dimensional image of the control element.

20. The computer program product of claim 19, wherein the infotainment system was not included in the vehicle.

* * * * *